Patented May 26, 1953

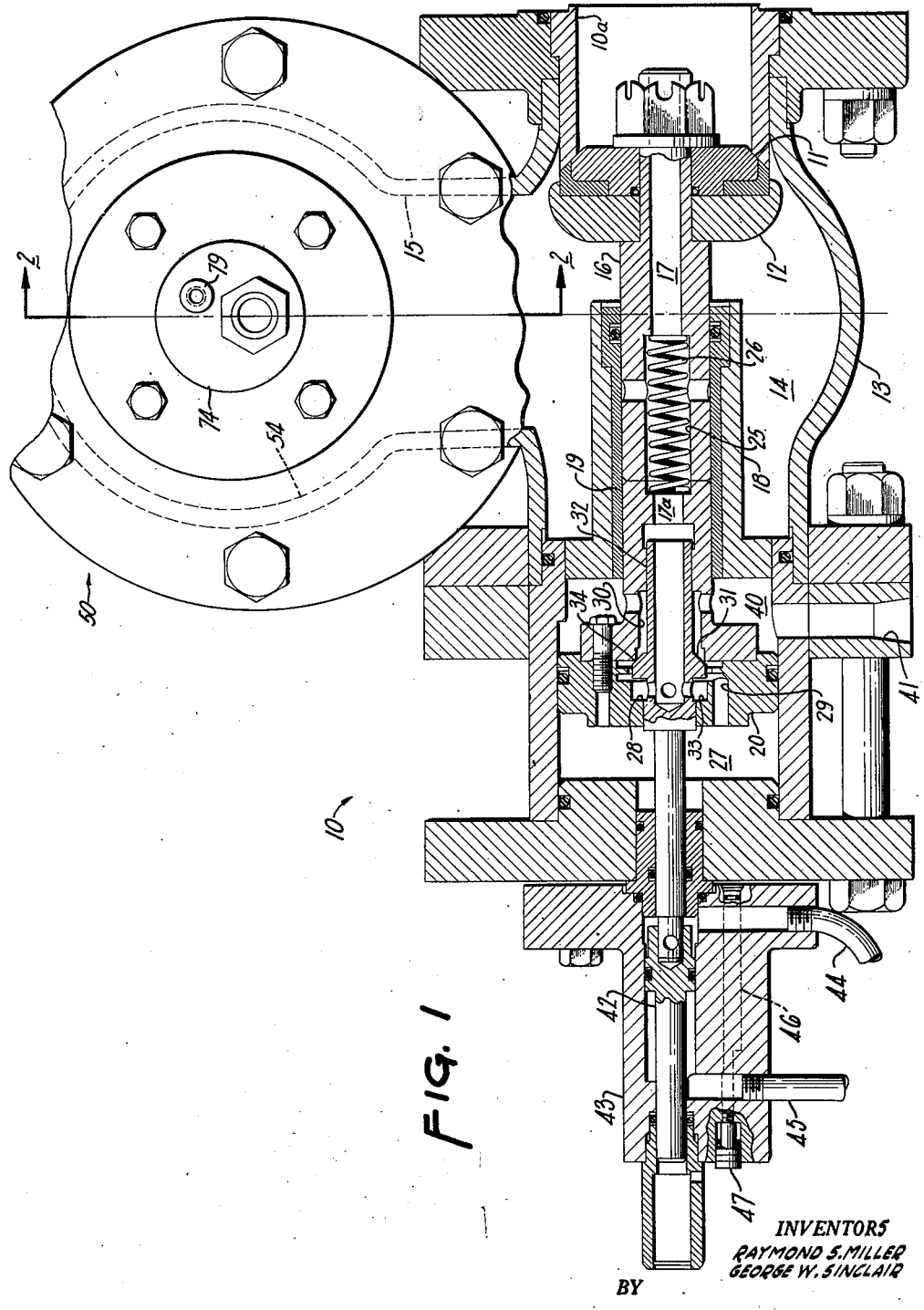

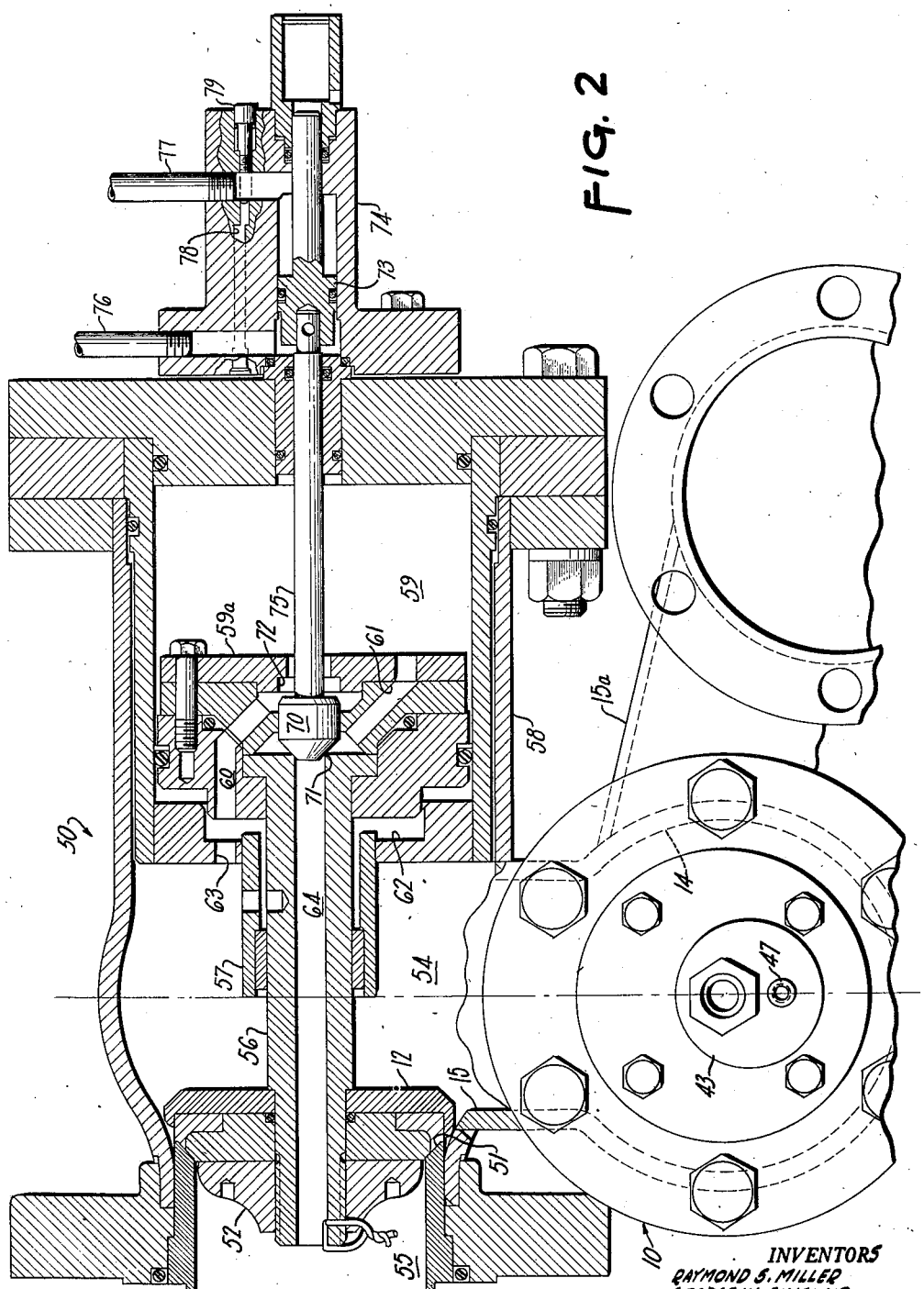

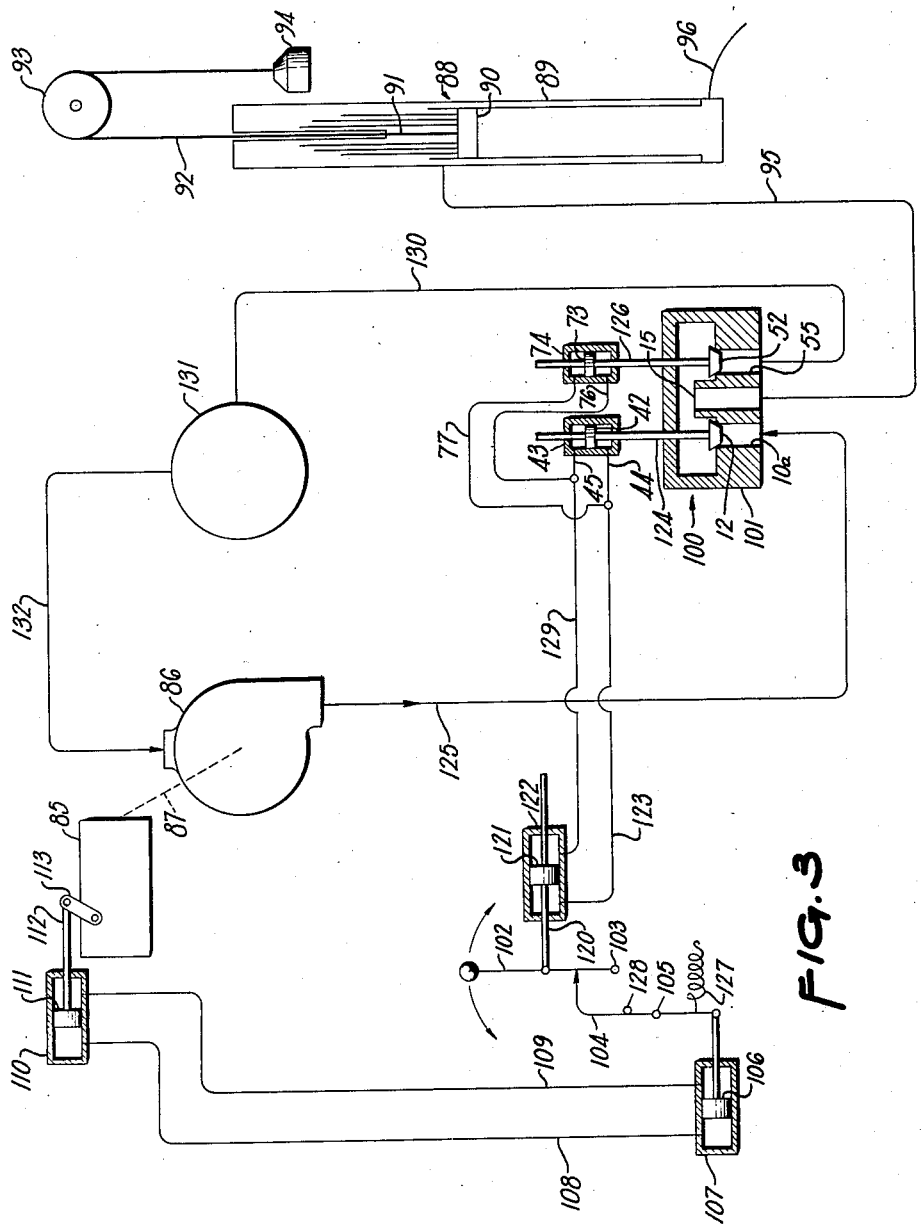

2,639,693

UNITED STATES PATENT OFFICE 2,639,693

HYDRAULIC CONTROL VALVE AND SYSTEM

Raymond S. Miller, Hollywood, and George W. Sinclair, Los Angeles, Calif., assignors to M. O. Johnston, Glendale, Calif.

Application April 23, 1949, Serial No. 89,321

5 Claims. (Cl. 121—46.4)

This invention relates to an hydraulic control system and to valve structures useful therein.

It is an object of the invention to provide an improved hydraulic control system and valve structures useful therein.

It is a further object of the invention to provide an hydraulic control system for controlling an hydraulic cylinder and synchronizing the same with the operation of a pump in order to hoist a load, hold the same and to lower the same at a predetermined rate.

It is a still further object of the invention to provide an hydraulic control system which is adapted to handle large volumes of liquid and to operate cat cylinders and the like used in hoisting, holding and lowering loads and in doing other odd jobs about an oil well drilling rig.

It is yet another object of the invention to provide hydraulically balanced valves which are adapted to use in a control system of the character described.

These and other objects of the invention will be apparent from the ensuing description and the appended claims.

One form which the invention may assume is exemplified in the following description and illustrated by way of example in the accompanying drawings, in which:

Fig. 1 is a view in longitudinal section of the inlet control valve of the system.

Fig. 2 is a similar view of an outlet control valve taken as a section along the line 2—2 of Fig. 1.

Fig. 3 is a schematic view of the system as a whole, including the valves of Figs. 1 and 2 as parts thereof.

Referring now to Fig. 1, there is shown an inlet valve structure generally designated as 10 having an inlet 10a and which is formed at one end with a valve seat 11 seating a check valve 12. A casting 13 defines a chamber 14, having an outlet passage 15 which communicates with a cat cylinder or other hydraulic device (not shown) through a gooseneck 15a and with an outlet control valve 50 which is described in detail hereinafter.

The valve 12 has a hollow stem 16 defining an axial passage 17, and it is slidable in a sleeve 18 in which the hollow rod 19 of a piston 20 is also slidably disposed. The rod 19 defines an axial passage 17a which is in effect an extension of the passage 17. An enlarged portion 25 formed in passages 17 and 17a receives an expansion spring 26. The piston 20 is held in predetermined position by means hereinafter described, and it will be seen that the valve 12 is capable of functioning as a check valve.

The piston 20 is reciprocable in a chamber 27, and it is formed with a chamber 28, a forward passage 29 and a rearward passage 30. The passages 29 and 30 communicate with the chamber 28 and the latter communicates with the passage 17a, as illustrated. A pilot valve 31 is disposed in the chamber 28, and it is provided with a stem 32 which is reciprocable in the passage 17a. The piston 20 is also formed with valve seats 33 and 34 for the pilot valve 31.

It will be apparent that, if the valve 31 is seated on seat 34, inlet pressure will be communicated through passages 17 and 17a, chamber 28 and forward passage 29 to chamber 27. Since the area of piston 20 is greater than the area of valve 12, the valve 12 will be positively closed by the pressure in chamber 27 acting on piston 20. When, however, the pilot valve 31 is seated on valve seat 33, pressure in the chamber 27 will bleed through passages 29 and 30 to a chamber 40 and out through a vent line 41 to a sump or storage vessel (not shown). Check valve 12 is then free to open under pressure in the inlet 10a.

The pilot valve 31 is controlled by an hydraulic slave piston 42, which is reciprocable in a cylinder 43. Two passages 44 and 45 are formed in the walls of the cylinder 43 and communicate with opposite ends of the cylinders. Also illustrated is an air bleed passage 46 which is normally sealed by a plug 47. Pressure is delivered to one end or the other of the slave piston through passage 44 or 45, by means described hereinafter. It is apparent that, by actuating piston 42, the pilot valve 31 is actuated and valve 12 is positively closed or is allowed to open under inlet pressure in the valve inlet 10, and that the degree of opening, hence the hydraulic pressure delivered to the hydraulic device, is thereby controlled. It is also apparent that, when the inlet pressure is decreased, spring 26 will close valve 12 to prevent reverse flow of fluid through inlet 10a. That is, valve 12 serves as a check valve as well as an inlet control valve.

Referring now to Fig. 2, an outlet valve structure generally designated as 50 is illustrated. This valve structure is formed with a valve seat 51 seating a valve 52. Fluid enters through outlet passage 15 of inlet control valve 10 into a chamber 54 and passes out through an outlet passage 55. The valve 52 is provided with a hollow stem 56 which is reciprocable in a sleeve 57 fixed to a casting 58 which defines a chamber 59. A piston 59a is fixed to the other end of the stem 56 and is reciprocable in the chamber 59.

The piston 59a is formed with an inlet passage 60 and an outlet passage 61. The inlet passage, as illustrated, communicates with the left-hand or inboard end of the chamber 59 and, through a dash pot 62 and a passage 63, with the valve chamber 54. The outlet passage 61, as illustrated, communicates with the chamber 59 and with an axial passage 64 defined by the hollow stem 56, and through the passage 64, with the outlet 55.

The areas on the opposite side of the piston 59a are equal. Hence, normally this position has no tendency to actuate the valve 52, which is closed by pressure in the chamber 54. For the purpose of positively opening the valve 52, a pilot valve 70 is provided, which may seat on a valve seat 71 to close outlet passage 61, or on a valve seat 72 to close inlet passage 60. Obviously, if the pilot valve 70 is seated on valve seat 71, the valve 52 will remain closed, and if valve 70 is seated on valve seat 72, pressure will bleed from chamber 59 through passages 61 and 64 to outlet 55. The area of piston 59a is greater than the area of valve 52; hence, when the pressure in chamber 59 is sufficiently reduced, the valve 52 will be opened by pressure exerted on piston 59a.

The pilot valve 70 is actuated by a slave piston 73 which is reciprocable in a cylinder 74. A rod 75 connects the pilot valve 70 and slave piston 73. Passages 76 and 77 communicate with opposite ends of the piston 73. Also illustrated is an air bleed passage 78 which is normally sealed by a plug 79. Hydraulic fluid under pressure is supplied to one end or the other of the slave piston 73 through passage 76 or 77 in the manner described hereinafter.

Referring now to Fig. 3, an engine 85 operates a pump 86 through any suitable mechanical linkage designated as 87. The pump 86 operates an hydraulic device 88 to lift a load 94 or to do other useful work. The hydraulic device 88 is illustrated as comprising a cylinder 89 in which a piston 90 is reciprocable. The piston 90 is connected by a rod 91 and a cable 92 trained over a sheave 93 to a load 94. Fluid pressure from the pump is admitted to one side of the piston 90 through a line 95, and compressed air from any suitable source (not shown) is admitted to the opposite side of the piston 90 through a line 96. The working fluid is the hydraulic fluid entering through line 95.

A valve control mechanism generally designated as 100 is illustrated. This control mechanism comprises a housing 101 and it also comprises the inlet valve structure 10 of Fig. 1 and the outlet valve structure 50 of Fig. 2. Only so much of these valve structures are shown in Fig. 3 as is necessary to understand their functions and operation. The structure of the control system of Fig. 3 will be best understood by a description of its operation.

If it is desired to lift the load 94, a remote control lever 102 fulcrumed at 103 is moved to the left, as viewed in Fig. 3. This actuates a lever 104 fulcrumed at 105 and urges a slave piston 106 to the left. The slave piston 106 is reciprocable in a cylinder 107 which communicates through lines 108 and 109 with a cylinder 110 in which a slave piston 111 is reciprocable. The slave piston 111 is connected with a linkage 112 with the throttle 113 of the engine 85. Therefore, movement of the piston 106 to the right will obviously cause movement of the slave piston 111 to the left and, as illustrated, will open the throttle 113 of the engine 85, thus accelerating the engine and thereby accelerating the pump 86 and delivering greater pressure to the hydraulic piston 90 for the purpose of lifting a load. Obviously, the degree of acceleration of the engine 85 and of the pump 86 will be governed by the extent of movement of the control lever 102.

At the same time, the control lever 102, acting through a link 120, moves a master piston 121 to the left. The piston 121 is reciprocable in a master cylinder 122. Pressure is thereby transmitted through a line 123 and inlet passage 44 of cylinder 43 to move slave piston 42 up (as viewed in Fig. 3) and, through the medium of pilot valve 31 etc. (collectively indicated as 124 in Fig. 3) to open valve 12. Pressure from the pump 86 is delivered through a line 125 through inlet passage 10a, past valve 12, and through outlet passage 15 and line 95 to cylinder 89.

At the same time, pressure will be delivered through passage 77 to the upper end of cylinder 74 to depress piston 73 and thereby hold outlet valve 52 in closed position through the medium of rod 75, pilot valve 70, etc. (collectively designated as 126 in Fig. 3).

If it is desired to hold the load at rest, the lever 102 is moved back to vertical or neutral position. Throttle control lever 104 is urged to the right by a spring 127 and is stopped in vertical position by a stop member 128. Engine throttle 113 is thereby returned to idling position so that the engine 85 continues in operation at idling speed and delivers no power to the pump. The tendency of the load 94, will, of course, be to raise the piston 90 and thereby drain hydraulic fluid from the cylinder 89 back into the pump. This, however, is prevented by the check valve 12.

When it is desired to lower the load, the control lever 102 is moved to the right, causing pressure to be delivered through a line 129 and passage 45 to cylinder 43 above piston 42 (thus firmly holding check valve 12 in closed position) and through passage 76 to cylinder 74 below piston 73, thus causing valve 52 to open. Fluid will then drain from cylinder 89 through line 95, past valve 52 and through outlet passage 55 and a line 130 to a sump 131. A line 132 communicates sump 131 with pump 86, as illustrated. It will be apparent that the rate of lowering the load can be controlled by lever 102.

It will thus be apparent that an hydraulic control system and valves useful therein have been provided, which are operable to supply hydraulic fluid to an hydraulic cylinder or other hydraulic device for performing useful work. It will also be apparent that by manipulation of a single control lever it is possible to supply hydraulic fluid to an hydraulic cylinder to lift a load at any desired rate, to hold the load steady at any selected position, and to lower the load at a controlled rate.

While we have shown the preferred form of our invention, it is to be understood that various changes may be made in its construction by those skilled in the art without departing from the spirit of the invention as defined in the appended claims.

Having thus described our invention, what we claim and desire to secure by Letters Patent is:

1. An hydraulic control system comprising a floating inlet valve spring pressed toward closed position and being operable as a check valve to prevent return of fluid when pressure on the outlet side thereof exceeds pressure on the inlet side, an outlet valve normally closed by outlet pressure, means for controlling the opening of said inlet valve, means for opening said outlet valve and means for synchronizing said inlet valve and outlet valve control means operable to maintain said outlet valve closed while pressure is being delivered through said inlet valve and to close said inlet valve when pressure is relieved through said outlet valve.

2. An hydraulic control system comprising inlet valve means including a floating inlet valve spring pressed toward closed position so as to tend to open under inlet pressure and to close when the return pressure exceeds the inlet pressure, outlet valve means including an outlet valve tending to close under outlet pressure, hydraulic means for controlling said inlet valve, hydraulic means for opening said outlet valve, and means for synchronizing said hydraulic means to maintain said outlet valve closed while pressure is being delivered through said inlet valve and to close said inlet valve when pressure is relieved through said outlet valve.

3. An hydraulic control system comprising means for supplying hydraulic fluid under pressure, a floating inlet valve operable to pass hydraulic fluid under pressure to an hydraulic device, said inlet valve being spring pressed toward closed position so as to be operable as a check valve to prevent return flow of fluid when the pressure on its outlet side exceeds the pressure on its inlet side, an outlet valve which is normally closed by outlet pressure, and hydraulic means operable to regulate the degree of opening of said inlet valve under inlet pressure, to maintain said outlet valve closed during delivery of inlet pressure, to control the degree of opening of said outlet valve to drain fluid from said hydraulic device and to close said inlet valve when fluid is drained through said outlet valve.

4. An hydraulic control system comprising an inlet valve, a piston movable relative to the inlet valve and being operable to close said inlet valve and to control the degree of opening thereof under inlet pressure, means for communicating inlet pressure to said piston to operate the same, a pilot valve operable to control the pressure on said piston, an outlet valve, a piston operable to close the same and to control the degree of opening thereof, means for communicating outlet pressure to said piston to operate the same, a pilot valve operable to control the pressure on said piston, and hydraulic means for operating said pilot valves.

5. An hydraulic control system comprising an inlet valve, a piston movable relative to the inlet valve and being operable to close said inlet valve and to control the degree of opening thereof under inlet pressure, means for communicating inlet pressure to said piston to operate the same, a pilot valve operable to control the pressure on said piston, an outlet valve, a piston operable to close the same and to control the degree of opening thereof, means for communicating outlet pressure to said piston to operate the same, a pilot valve operable to control the pressure on said piston, and hydraulic means for operating said pilot valve, said hydraulic means being operable to maintain said outlet valve closed while pressure is being delivered through said inlet valve and to close said inlet valve when pressure is being relieved through said outlet valve.

RAYMOND S. MILLER.
GEORGE W. SINCLAIR.

References Cited in the file of this patent

UNITED STATES PATENTS

| Number | Name | Date |
|---|---|---|
| 344,307 | Crouan | June 22, 1886 |
| 354,020 | Morey | Dec. 7, 1886 |
| 396,206 | Heermans | Jan. 15, 1889 |
| 412,327 | Gibson | Oct. 8, 1889 |
| 531,595 | Otis | Dec. 25, 1894 |
| 560,230 | Powers, Jr. | May 19, 1896 |
| 1,012,004 | Pearson | Dec. 19, 1911 |
| 1,165,653 | Dunn | Dec. 28, 1915 |
| 1,214,496 | Armstrong | Feb. 6, 1917 |
| 1,764,366 | Stuebing | June 17, 1930 |
| 2,038,167 | Farmer et al. | Apr. 21, 1936 |
| 2,146,213 | Horton | Feb. 7, 1939 |
| 2,417,947 | Reedy | Mar. 25, 1947 |